United States Patent [19]

Stokes

[11] Patent Number: 4,490,926
[45] Date of Patent: Jan. 1, 1985

[54] SOLAR DRYING DEVICE AND METHOD FOR DRYING

[76] Inventor: Scott Stokes, 206 Jane St., Mazomanie, Wis. 53560

[21] Appl. No.: 444,787

[22] Filed: Nov. 26, 1982

[51] Int. Cl.³ .............................................. F26B 9/06
[52] U.S. Cl. ......................................... 34/76; 34/77; 34/93
[58] Field of Search .............. 34/93, 76, 77; 126/429, 126/430, 426

[56] References Cited

U.S. PATENT DOCUMENTS

| | | | |
|---|---|---|---|
| 487,965 | 12/1892 | Piver . | |
| 1,233,974 | 7/1917 | Burlew .................................... | 34/93 |
| 1,954,674 | 4/1934 | Lager . | |
| 2,529,621 | 11/1950 | Mayo . | |
| 2,939,223 | 6/1960 | Smith ..................................... | 34/164 |
| 2,949,678 | 8/1960 | Anderson .............................. | 34/229 |
| 3,326,206 | 8/1967 | Sasaki et al. ............................ | 34/93 |
| 3,412,728 | 11/1968 | Thomason . | |
| 3,791,076 | 2/1974 | Gahler . | |
| 3,866,334 | 2/1975 | Huang . | |
| 4,160,523 | 7/1979 | Stevens ................................ | 126/426 |

FOREIGN PATENT DOCUMENTS 785615 12/1980 U.S.S.R. .................................. 34/93

OTHER PUBLICATIONS

"Experimental Solar-Dehumidifier Kiln for Drying Lumber," Peter Y. S. Chen et al., *Forest Products Journal*, vol. 32, No. 9, pp. 35-41, Sep. 1982).

*Primary Examiner*—Larry I. Schwartz
*Attorney, Agent, or Firm*—Isaksen, Lathrop, Esch, Hart & Clark

[57] ABSTRACT

A solar drying device for drying wet material. The device includes an air-filled drying chamber adapted to contain wet material to be dried. A solar collector heats the wet material and air contained within the drying chamber. A dehumidification system includes a dehumidification chamber defined in part by an outer panel and an inner panel, the outer panel being in contact with the ambient atmosphere. The dehumidification chamber forms at least part of a wall of one of the drying chamber and the solar collector. Means are provided for directing warm, moist air from the drying chamber through the dehumidification chamber so that water from the moist air condenses on the outer panel. The air is then directed to one of the drying chamber and the ambient atmosphere. Means are provided for removing the condensed water from the dehumidification system. Thus the solar drying device provides that at least one of the drying chamber and the solar collector may be thermally insulated from the ambient atmosphere in part by the dehumidification chamber.

22 Claims, 5 Drawing Figures

SOLAR DRYING DEVICE AND METHOD FOR DRYING

TECHNICAL FIELD

The present invention relates to dryers for lumber, tobacco, grain, and the like and, in particular, to such dryers adapted to be heated with solar energy.

BACKGROUND OF ART

The art is cognizant of the use of enclosed structures for drying wet or damp materials, such as lumber, grain, and tobacco. Piver, U.S. Pat. No. 487,965, shows such a structure or "house" for drying lumber in which a furnace is used to supply heat to facilitate the drying process. Thomason, U.S. Pat. No. 3,412,728, Mayo, U.S. Pat. No. 2,529,621, and Huang, U.S. Pat. No. 3,866,334, all show drying houses or kilns that employ solar radiation as a source for at least part of the heat used in the dryer. Mayo and Huang provide for furnaces that are simply aided by a contribution from solar energy. Thomason and Mayo provide for the introduction from the outside of fresh air into the system and the venting of inside air that has become excessively humid.

When an enclosed structure is used for drying large amounts of material or material such as lumber that comes in large pieces, convenient, unobstructed access to the interior of the structure is desirable. Piver and Huang show wheeled vehicles or carts to carry the material to be dried, together with doors in the end or side walls of their dryers especially adapted to admit them. Lager shows a miniature greenhouse that is essentially a rectangular glass box with a slant roof. The roof opens upwardly, being hinged at its back edge. Access is then had from above.

The prior art is cognizant of the need to insulate heated drying houses and the like from the cooler, ambient atmosphere. Thus, Mayo shows an insulative layer in the roof of a drying house. Gahler, U.S. Pat. No. 3,791,076, shows a double layer, plastic greenhouse wall constructed of a flexible, light-admitting sheet material. The double sheets of plastic are inflated to space their central portions apart and provide an insulative double glazing.

In maintaining an elevated interior temperature for a drying house or other device for drying wet materials, it is desirable to avoid wasting the heat of humid interior air at the same time that is necessary to provide some sort of venting or dehumidification system to remove moisture from the interior of the drying house. Mayo shows partial recycling of the heated air of the drying house disclosed, presumably until the air is no longer efficient as a drying medium. Furthermore, a heat exchange system is provided wherein exhausting air is allowed to warm a heat sink that in turn warms incoming air.

It is also known to use conventional, electrically powered dehumidification systems to remove humidity from the air of a dryer. For a discussion of such dryers, see "Experimental Solar-dehumidifier Kiln for Drying Lumber," Peter Y. S. Chen, et al., *Forest Products Journal* 32(9): 35-41 (1982). The cost of operating such a dehumidification system can be high, however, and must be weighed against the cost of simply venting humid air and heating new, dry air drawn from outside the system. In addition, such electrical dehumidification systems generally must employ fairly complicated machinery. Such machinery is subject to breakdown, especially in the often corrosive atmosphere of a drying device loaded with green lumber. Furthermore, if the dehumidifier utilizes a conventional two coil refrigeration mechanism to condense out water from the air, a choice must be made between locating the radiating coil of the dehumidifier outside the drying chamber, in the cooler, surrounding atmosphere, or inside, where heat will not be lost from the dryer but the efficiency of the dehumidifier will be reduced and the coil may be subject to corrosive conditions.

The prior art is not cognizant of a unified system adapted to simultaneously dehumidify the air from within a solar heated drying device and provide for improved thermal insulation of the interior of the device from the cooler ambient atmosphere. Furthermore, the art is not cognizant of such a system that also provides nearly unrestricted access to the interior of the drying device.

BRIEF SUMMARY OF THE INVENTION

The present invention is summarized in that a solar drying device for drying wet material includes an air filled drying chamber having walls, adapted to contain the wet material. A solar collector having walls is provided that is adpated to heat the wet material and the air contained within the drying chamber to a temperature greater than that of the ambient atmosphere. The solar drying device further includes a dehumidification system having a dehumidification chamber, the dehumidification chamber being defined at least in part by an outer panel and an inner panel, the outer panel being in contact with the ambient atmosphere. The dehumidification chamber forms at least part of a wall of one of the drying chamber and the solar collector. The dehumidification system further includes means for directing warm, moist air from the drying chamber through the dehumidification chamber so that water from the moist air may condense on the outer panel. Means are provided for directing air from the dehumidification chamber to one of the drying chamber and the ambient atmosphere. Means are also provided for removing the condensed water from the dehumidification system, whereby at least one of the drying chamber and the solar collector may be thermally insulated from the ambient atmosphere in part by the dehumidification system.

The method for drying of the invention includes the steps of directing the moist air from the drying chamber of a solar drying device of the sort described above between the inner and outer panels of a dehumidification chamber of the sort described above. Water from the moist air is then condensed on the outer panel, whereupon the dehumidified air is returned to one of the drying chamber and the ambient atmosphere. Then, the condensed water is removed from the dehumidification system, whereby the contents of the drying chamber may be thermally insulated from the ambient atmosphere in part by the dehumidification chamber.

A primary object of the invention is to provide a dehumidification system for removing the moisture from air from a drying device, the dehumidification system being adapted to require a minimum of electrical energy for its operation.

A second object of the invention is to provide such a dehumidification system in which what otherwise would be waste heat lost from the moist air as part of the dehumidification process is utilized to isolate in part the solar collector and the warm contents of the drying device from the cooler temperatures of the ambient atmosphere.

Another object of the invention is to provide such a dehumidification system that utilizes a dehumidification chamber that is solar radiation transmitting and thus may be used as the window of a solar collector, whereby the interior of the solar collector may be thermally insulated from the ambient atmosphere in part by the dehumidification chamber.

Yet another object of the invention is to provide a solar drying device of physically simple design wherein thermal energy is conserved and the efficiency of the device is improved by dehumidifying and returning to the drying device air that has been heated therein and allowed to absorb moisture from the material being dryed.

A further object of the invention is to provide such a solar drying device in which substantially unrestricted access may be had to the interior of the device for loading and unloading.

Yet another object of the invention is to provide a solar drying device of an efficient and economical nature that can be built with a minimum of moving parts from conventional and readily obtainable materials.

Other objects, features, and advantages of the invention will be apparent from the following detailed description taken in conjunction with the accompanying drawings showing a preferred embodiment of a solar drying device exemplifying the principles of the invention.

DETAILED DESCRIPTION OF THE PREFERRED EMBODIMENT

Figure 1:
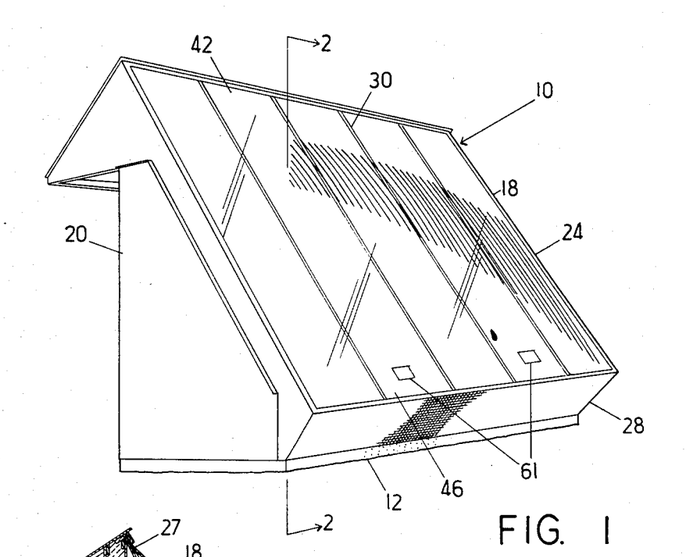
FIG. 1 is a perspective view of a solar drying device constructed in accord with the present invention.

Referring more particularly to the drawings, wherein like numbers refer to like parts, FIG. 1 shows a solar drying device, generally indicated at 10, constructed in accord with the present invention. The solar drying device 10 includes an air-filled drying chamber 14 adapted to contain wet material, represented schematically at 11, to be dried. The drying chamber 14 is heated by solar energy by means disclosed below, causing water to evaporate from the wet material. A dehumidification system, disclosed below, then removes the water from the air of the drying chamber 14, expelling it from the drying device 10.

The drying chamber 14 has a base 12. Preferably the base 12 is a conventional concrete slab supported by the ground and insulated therefrom in conventional ways. Walls defining the drying chamber 14 are attached to the base 12 and extend upwardly therefrom. The walls include a back wall 16, front wall 18, and opposed side walls 20. Preferably, all the walls are insulated, the back and side walls 16, 20 being insulated in any convenient, conventional way, such as by the batting shown at 22. The insulation of the front wall 18 will be discussed below.

The front wall 18 preferably includes an upwardly facing portion 24 that is substantially planar, with a lower margin 26 and upper margin 27. The upwardly facing portion is adapted to face toward the sun with the plane of the upwardly facing portion substantially at right angles to the direction of the sun's rays at midday. Preferably, the lower margin 26 of the upwardly facing portion 24 extends forward of the base 12. A planar, downwardly facing portion 28 then exends from the lower margin 26 of the upwardly facing portion 24 to the base 12. Preferably, the plane of the downwardly facing portion 20 is generally parallel to the sun's rays at midday.

Figure 3:
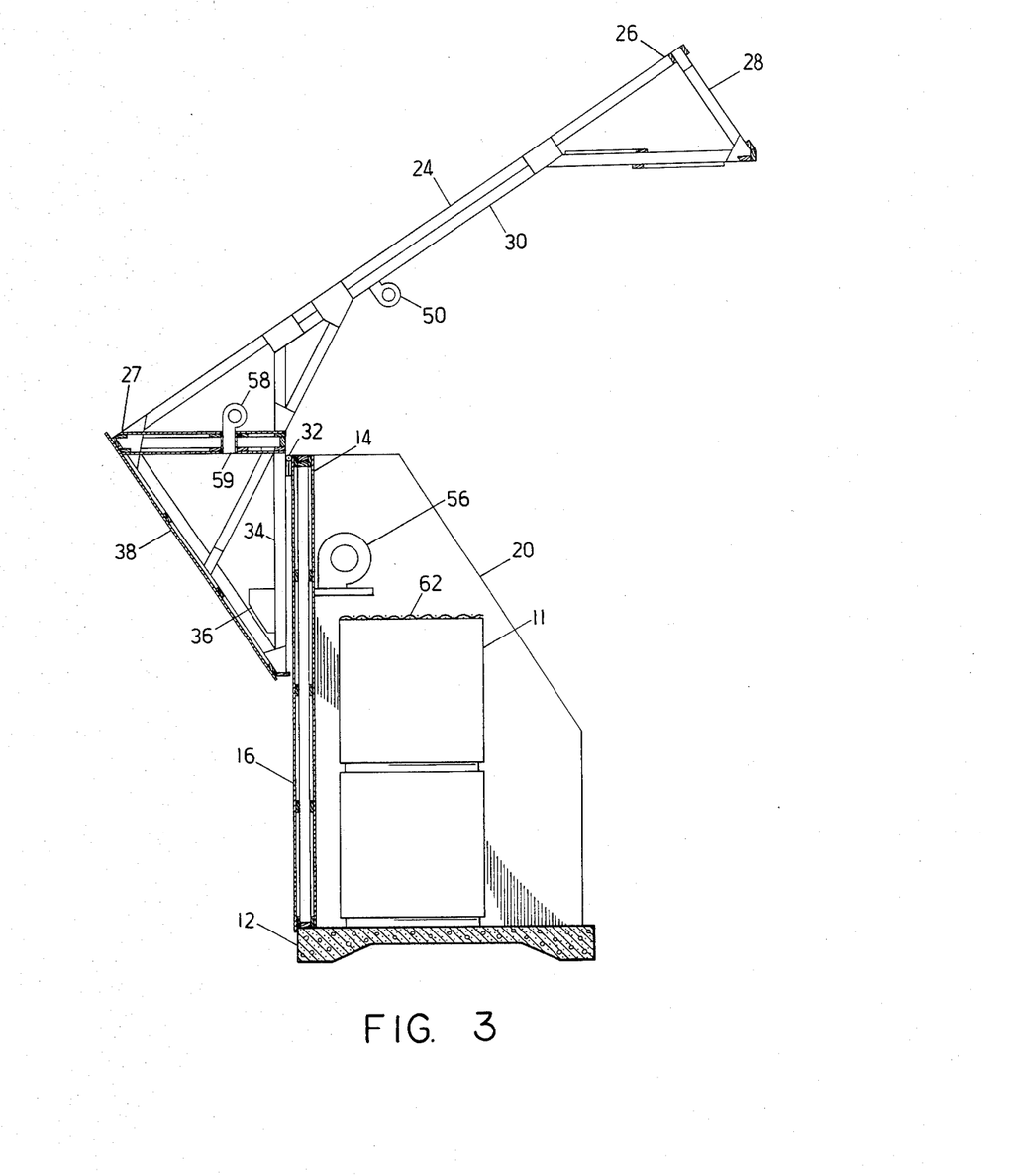
FIG. 3 is a cross sectional view similar to that of FIG. 2 with the forwardly facing wall of the solar drying device in its open position and with the dehumidification chamber and insulating material omitted.

The front wall 18 is a substantially rigid, unitary structure. In the preferred embodiment, a rigid framework for the front wall 18 is constructed with struts 30 that hold the upwardly facing and downwardly facing portions 24, 28 of the front wall in rigid relation to each other. The front wall 18 is attached to the back wall 16 in hinged relation by means of hinges 32 that turn about a common, generally horizontal axis that is parallel to the back wall. The front wall 18 has a closed position in which its parts have the location relative to the base 12 and direction of the sun's rays disclosed above. The front wall is adapted to swing upwardly on the hinges 32 to an open position, as is illustrated in FIG. 3. Preferably, the front wall 18 swings through at least a 90 degree angle in moving from its closed position to its open position. As a consequence, when in its open position the front wall 18 is lifted high enough to allow substantially unrestricted access to the drying chamber 14.

Figure 2:
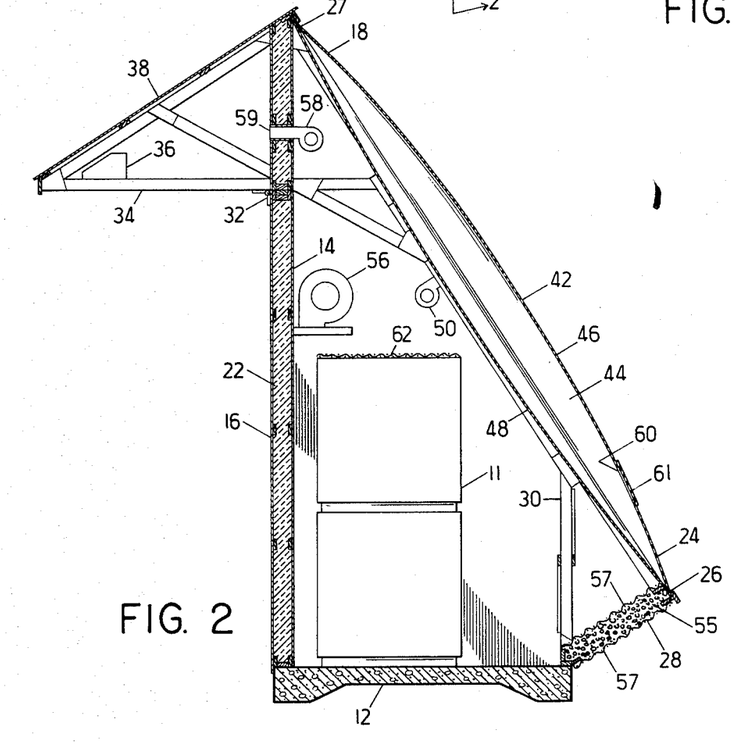
FIG. 2 is a cross sectional view of the solar drying device of FIG. 1 taken along section line 2—2.

Each strut 30 preferably includes a rigid, balance weight support member 34 that extends rearwardly from the upwardly facing portion 24 of the front wall 18 at a selected distance above the base 12. The balance weight support member 34 extends beyond the back wall 16. The hinges 32 may be conveniently attached to the balance weight support members and backwardly facing portions of the back wall 16, as is illustrated in FIGS. 2 and 3. The balance weight support members 34 support a cantilevered balance weight 36. The mass of the balance weight 36 is selected to be such that the front wall 18 is at least partially balanced on the hinges 32. As a consequence, a user of the solar drying device 10 may lift the front wall 18 from its closed to its open position with reduced effort. Depending upon the size of the solar drying device 10, the front wall 18 may be so moved manually or by any of a number of conventional modes such as pneumatic rams, rope and pully arrangements driven electrically or manually, and the like. Suitable arrangements would be obvious to one skilled in the art and none are shown. Likewise, conventional latches to hold the front wall 18 in either its closed or open position can be provided in conventional ways obvious to one skilled in the art.

A roof 38 may extend from the upper margin 27 of the upwardly facing portion 24 of the front wall 18 to the rearwardmost part of the balance weight support members 34. By this means, the area behind and adjacent to the back wall 16 may be partially protected from the elements, providing exterior storage.

The drying chamber 14 is adapted to be heated by means of a solar collector. Preferably, the upwardly facing portion 24 of the front wall 18 is closed with a solar radiation transmitting material, to form a window 42, so that the drying chamber 14 with the window itself functions as a solar collector. Solar radiation transmitted therethrough is absorbed by the parts of the drying chamber 14 and its contents against which it impinges. By this means, the wet material 11 and the air surrounding it may be warmed, increasing the amount of water from the wet material that can be absorbed by the air, rendering the air humid and warm in comparison with the ambient atmosphere. Alternatively, a separate solar collector having a solar radiation transmitting window may be used, the heat produced thereby being transferred to the drying chamber 14 by any conventional method.

The dehumidification system adapted to remove water from the warmed and humid air of the drying chamber 14 includes a dehumidification chamber 44. The dehumidification chamber 44 is defined at least in part by opposed surfaces of an outer panel 46 and inner panel 48. The outer panel 46 is in contact with the ambient atmosphere. Preferably, the outer and inner panels 46, 48 are made of a solar radiation transmitting material, allowing the dehumidification chamber 44 to serve as a double glazing for the window 42.

A window blower 50 is adapted to direct warm, moist air from the drying chamber 14 through a blower port 51 in the inner panel 48 and into the dehumidification chamber 44. Preferably, the window blower 50 directs air through the inner panel 48 at a convenient, generally central location therein. The inner panel 48 has air vents 52 extending therethrough at selected locations about the periphery of the inner panel 48. Thus, the air blown through the blower port 51 into the dehumidification chamber 44 by the window blower 50 is returned through the air vents 52 to the drying chamber 14 after passing between the outer and inner panels 46, 48 for a selected distance. Because the outer panel 46 is in contact with the atmosphere surrounding the solar drying device 10, the temperature of which atmosphere will generally be less than that of the air heated within the drying chamber 14, the outer panel absorbs heat from the warm, moist air passing through the dehumidification chamber 44, causing water therefrom to condense on the outer panel. Consequently, the air returning to the drying chamber 14 through the air vents 52 is dehumidified and rendered capable of absorbing yet more water from the wet material 11.

Although they may be rigid, preferably the outer and inner panels 46, 48 are made of a flexible sheet plastic material fastened together along the perimeters of the outer and inner panels 46, 48 in substantially air-tight relation. When made of flexible materials, the dehumidification chamber 44 defined by such panels is inflated by the window blower 50, so that the central parts of the panels are forced apart. When so inflated, a dehumidification chamber 44 constructed of such materials effectively resists wind pressure and the like.

Figure 5:
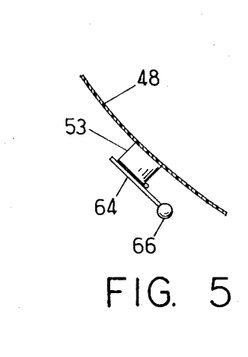
FIG. 5 shows a portion of the interior panel of the dehumidification chamber in cross section, together with a valve attached thereto.

The window blower 50 may be operated constantly, with its speed variable in response to the humidity in the drying chamber 14, or intermittently. If the window blower 50 is operated with variable speed or intermittently, the air vents 52 may be provided with valves 53 that allow air to pass through the air vents from the dehumidification chamber 44 to the drying chamber 14 only when there is a sufficiently large pressure differential between the dehumidification and drying chambers. Preferably the valves 53 include pivoting flaps 64 biased toward a closed position by a counter weight 66, as is shown in FIG. 5, but any means to accomplish a like function may be used. As consequence of the use of the valves 53, the dehumidification chamber 44 tends to remain inflated after the window blower 50 is turned off, providing an insulating dead air space between the outer and inner panels 46, 48.

It will be appreciated that the formation of condensed water droplets in the dehumidification chamber 44 on the outer panel 46 will tend to reduce the solar radiation transmitting properties of the window 42 and hence the heat gathering capacity of the solar drying device 10. To control this effect, the material of which at least the outer panel 46 is made may be selected so that its interiorly facing surface is wetable and water condensing thereon will tend to flow downwardly in a substantially smooth sheet with minimal droplet formation. Similarly, a wetting agent may be applied to the interiorly facing surface of at least the outer panel 46 with the same effect.

Alternatively, at least the outer panel 46 may be subjected to vibration from a conventional, eccentrically mounted cam vibrating device or equivalent mechanical or electrical means for vibrating the panel (not shown), causing water droplets to migate downwardly under the influence of gravity, clearing the panel of condensed water. The vibrating means may be controlled by a conventional electrical or mechanical timer (not shown) serving as a means for timing the vibrating means to select the frequency with which the condensed water is cleared, thereby allowing a selection of the ability of the panels 46, 48 to transmit solar ratiation. By this means the temperature of the drying chamber may be controlled. A thermostat or other temperature responsive means for actuating the vibrating means likewise may be employed to clear the condensed water and increase the panels' ability to transmit solar radiation in response to a cooling of the drying chamber below a preselected temperature.

At least one of the outer and inner panels 46, 48 has a water escape aperture 54 extending therethrough at a location that is at the bottom of the dehumidification chamber 44 when the front wall 18 is in its closed position. Water condensed within the dehumidification chamber 44 may be allowed to drain through the water escape aperture 54, being drawn by gravity. Furthermore, when the pressure of the air within the dehumidification chamber 44 is greater than that outside of it because of the operation of the window blower 50, that air pressure will further serve to expel water through the water escape aperture 54. If intermittent operation of the window blower 50 is desired, it is advantageous to equip the water escape aperture 54 with a valve comparable to the valve 53 disclosed above.

Figure 4:
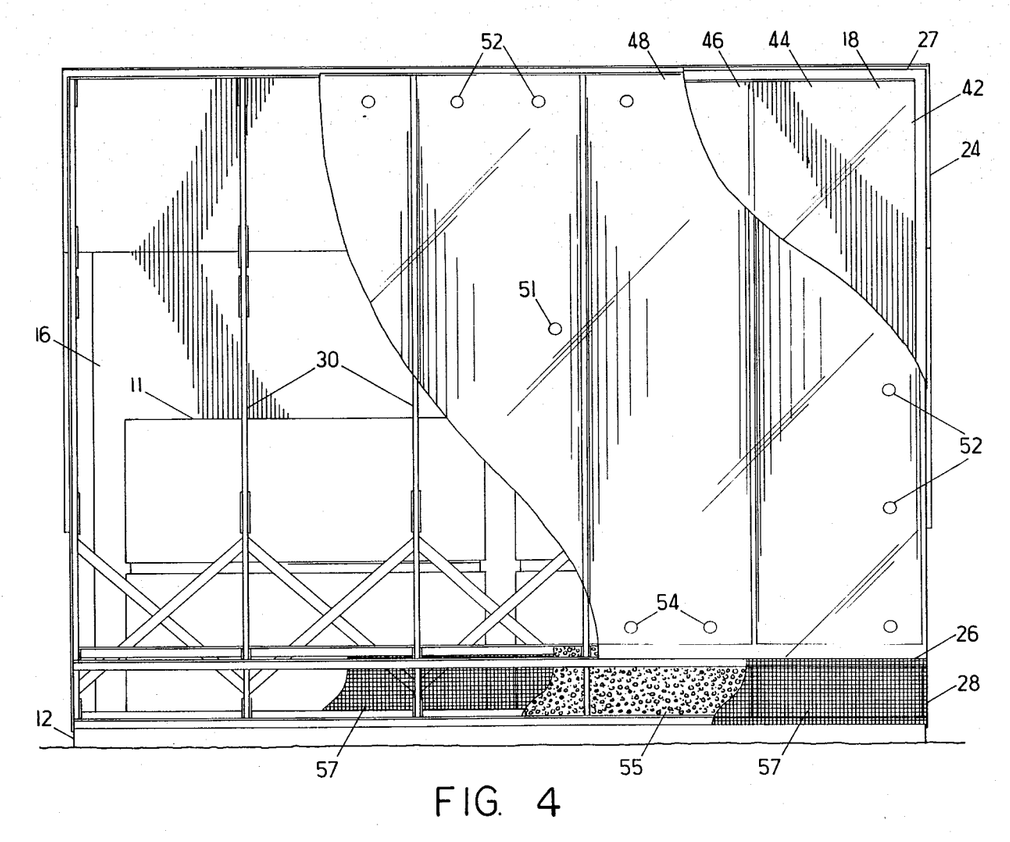
FIG. 4 is a front elevation view of the solar drying device of FIG. 1 with various parts thereof broken away.

In the event that the water is allowed to drain through the outer panel 46, it is thus immediately expelled from the solar drying device 10. Water draining through water escape apertures 54 located in the inner panel 48, reenters the drying chamber 14. A collection trough or comparable device (not shown) can be provided to collect such water and remove it from the drying chamber 14 before it evaporates. Similarly, the downwardly facing portion 28 of the front wall 18 may be made of a water permeable material through which the water may immediately drain and thus be expelled from the drying chamber 14. Preferably the downwardly facing portion 28 includes a layer of insulating polystyrene beads 55 held between screens 57, as is shown in FIG. 4. Such an arrangement also provides for the draining from the drying chamber 14 of any water that may condense on the side of the inner panel 48 that faces the interior of the drying chamber, after such water has been drawn by gravity to the lower margin 26 of the upwardly facing portion 24 of the front wall 18. The use of the beads 55 also allows air to pass through the downwardly facing portion 28 when the air pressures of the ambient atmosphere and the drying chamber 14 are unequal. This would commonly occur when the temperatures inside the drying chamber 14 are changing.

It will be apparent that, when the dehumidification chamber 44 is used to close the window 42 through which solar radiation enters the drying chamber 14, the outer and inner panels 46, 48 will serve as a double glazing for the window and thus act to insulate the interior of the drying chamber 14 from the ambient atmosphere. However, beyond simply providing a double glazing, the functioning of the dehumidification chamber 44 disclosed above provides for a layer of warm air to be interposed between the drying chamber 14 and the ambient atmosphere, further insulating the drying chamber. In addition, the heat of condensation that may be lost as waste energy to an electrical dehumidification device serves to warm the outer panel 46, reducing the temperature gradient across the window 42 and thus reducing heat loss therethrough. By several cooperating mechanisms, then, the dehumidification chamber 44 reduces heat loss through the window 42, increasing the efficiency and potential interior temperatures of the drying chamber 14. In the event a separate solar collector is used to heat air passed through it from the drying chamber 14, as is discussed above, the dehumidification chamber 44 may function in a corresponding way as the window thereof. Alternatively, the dehumidification chamber 44 may be located in any wall of the drying chamber 14 or of a separate solar collector, exterior to any insulation included in the wall, effectively removing humidity from the moist air of the drying chamber and contributing to the insulation of the wall.

In order to facillitate the drying of the wet material 11, a circulation blower 56 is employed to circulate the air within the drying chamber 14 to encourage transfer of water from the wet material to the air. Squirrel cage blowers, fans, or any conventional means of moving air may be employed. The wet material 11 may be so stacked or held that a relatively large surface area thereof is exposed to the circulating air.

An exhaust fan 58 is adapted to exhaust air from the drying chamber 14, preferably through an exhaust port 59 extending through the back wall 16 to the outside atmosphere. Air exhausted from the drying chamber 14 is replaced by outside air drawn in through the downwardly facing portion 28 of the front wall 18, in the event it is air permeable. Alternatively, air vents may be included in any of the walls of the drying chamber 14. Use of the exhaust fan 58 provides a means for reducing the temperature of the air in the drying chamber 14 and removing excess humidity in the event that heat collected becomes excessive or the water lost from the wet material 11 exceeds the capacity of the dehumidification system to remove it.

When the wet material 11 has been dried to a considerable extent, the dehumidification chamber 44 may not be capable of extracting water from the humid air of the drying chamber 14 to the extent necessary to provide for further drying. It may then be advantageous to exhaust the air from the dehumidification chamber 44 directly into the atmosphere, drawing new air into the drying chamber 14 and heating it. To facilitate this operation, the outer panel 46 of the dehumidification chamber 44 may include openable exhaust vents 60, adapted to exhaust air from the dehumidification chamber to the surrounding atmosphere when opened by a user of the drying device 10. Such extend vents 60 may be closable by any convenient means, such as the flaps 61 shown in FIG. 2. Such flaps 61 may be secured by hook and mesh closures such as those sold by VEL-CRO USA Inc. of New York, N. Y., under the VEL-CRO trademark or by tape or any other convenient means. It will be appreciated that, even if the dehumidifying functions of the dehumidification chamber are not fully taken advantage of when such exhaust vents 60 are in use, the dehumidification chamber nevertheless serves to insulate the interior of the drying chamber 14 from heat loss through the window 42. Thus, what otherwise would be lost as waste heat in the expelled air is put to advantageous use.

The solar drying device 10 may be constructed of conventional building materials, including conventional framing lumber, insulation, and siding. It is useful to select materials for the interior of the drying chamber 14 that increase the thermal mass thereof. Thus, while the base 12 may include soil, crushed rock, or the like, a concrete base, as disclosed above, is preferable. Similarly, while any heat and moisture resistant wall covering may be used to line the drying chamber 14, aluminum or galvanized steel sheeting advantageously increases thermal mass. Finishing the interior of the drying chamber 14 in a flat black color improves the solar energy absorbing abilities of the drying chamber. When the wet material 11 is itself light in color or otherwise reflective, it may be desirable to cover all or part of the material with a heat absorbing fabric or sheeting, such as that shown in FIG. 2 at 62. In the event cooler temperatures are desirable to provide for slow drying rate, as is the case when white oak is dried in the solar drying device 10, such heat-absorbing sheeting 62 may be omitted.

The solar drying device 10 as disclosed above may depend solely on solar radiation for heating. However, conventional electrical, gas, wood, or fossil fuel heating devices also may be used to supplement solar radiation in the event that higher temperatures are desired or especially cold ambient atmosphere temperatures are encountered. Likewise, such supplementary heating may be employed when the drying device 10 is used in areas in which cloud cover and other obstructions to solar radiation are commonly encountered. Such heating devices and the method of their use are well known and will not be discussed further herein.

The method of the invention for drying wet material in a solar heated drying chamber 14 having the structure disclosed above with the upwardly facing portion 24 of the front wall 18 closed with a dehumidification chamber 44 having inner and outer panels 48, 46 made of solar radiation transmitting material includes the steps of directing warm, moist air from the drying chamber between the inner and outer panels. Water is then condensed from the warm, moist air onto the outer panel 46, whereupon the air is returned to one of the drying chamber 14 and the ambient atmosphere. The condensed water is then removed from between the panels 46, 48 and expelled from the dehumidification chamber 44. The step of removing the condensed water from between the panels may also include applying a wetting agent at least to the inwardly facing side of the outer panel 46 in the manner disclosed above. Alternatively, the step of removing the condensed water may include vibrating at least the outer panel 46 to clear it of condensed water. The step of vibrating the outer panel 46 may include initiating vibration as a consequence of the falling of the temperature of the air within the drying chamber 14 below a selected temperature.

It is understood that the present invention is not limited to the particular construction and arrangement of parts illustrated and disclosed nor to the particular steps disclosed herein. Instead, it embraces all such modified forms thereof as come within the scope of the following claims.

What is claimed is:

1. A solar drying device for drying wet material comprising:
   (a) an air filled drying chamber having walls, adapted to contain the wet material;
   (b) a solar collector having walls, adapted to heat the wet material and the air contained within the drying chamber to a temperature greater than that of the ambient atmosphere; and
   (c) a dehumidification system having
      a dehumidification chamber having an interiorly facing surface adapted to be cooler than the air contained within the drying chamber when that air has been heated by the solar collector, the dehumidification chamber being defined at least in part by an outer panel and an inner panel, the outer panel being in contact with the ambient atmosphere, and the dehumidification chamber forming at least part of a wall of one of the drying chamber and the solar collector;
      means for directing warm, moist air from the drying chamber through the dehumidification chamber so that water from the moist air may condense on the outer panel,
      means for directing air from the dehumidification chamber to one of the drying chamber and the ambient atmosphere, and
      means for removing the condensed water from the dehumidification system, whereby at least one of the drying chamber and the solar collector may be thermally insulated from the ambient atmosphere in part by the dehumidification chamber.

2. The solar drying device of claim 1 wherein air from the dehumidification chamber is directed to the drying chamber.

3. The solar drying device of claim 1 wherein the panels of the dehumidification chamber are made of a flexible sheet material and wherein the dehumidification system includes means for directing air from the drying chamber into the dehumidification chamber at a pressure greater than that of the ambient atmosphere, inflating the dehumidification chamber and thus forcing the panels away from each other.

4. The solar drying device of claim 1 wherein the solar collector has a glazed solar radiation gathering window, the inner and outer panels of the dehumidification chamber are made of a material that is solar radiation transmitting, and the dehumidification chamber is adapted to serve as the glazing of the window of the solar collector, whereby the interior of the solar collector may be thermally insulated from the ambient atmosphere in part by the dehumidification chamber.

5. The solar drying device of claim 4 wherein the inner and outer panels of the dehumidification chamber have opposed interiorly facing surfaces and in which the interiorly facing surface of at least the outer panel is wetable to cause water condensing thereon the flow downwardly in a substantially smooth sheet with minimal droplet formation, whereby interference with the ability of the panels of the dehumidification chamber to transmit solar radiation as a consequence of droplet formation is reduced.

6. The solar drying device of claim 5 wherein the interiorly facing surface of at least the outer panel is treated with a wetting agent.

7. The solar drying device of claim 1 wherein the inner and outer panels of the dehumidification chamber are solar radiation transmitting and are adapted to intercept solar radiation and transmit it to the interior of the drying chamber to heat the wet material and air contained therein, whereby the drying chamber and dehumidification chamber coact to serve as the solar collector, and the interior of the drying chamber together with the wet material and the air contained therein are thermally insulated from the ambient atmosphere in part by the dehumidification chamber.

8. The solar drying device of claim 7 wherein the panels of the dehumidification chamber are made of a flexible sheet material and wherein the dehumidification system includes means for directing air from the drying chamber into the dehumidification chamber at a pressure greater than that of the ambient atmosphere, inflating the dehumidification chamber and thus forcing the panels away from each other.

9. The solar drying device of claim 7 wherein the inner and outer panels of the dehumidification chamber have opposed interiorly facing surfaces and in which the interiorly facing surface of at least the outer panel is wetable to cause water condensing thereon to flow downwardly in a substantially smooth sheet with minimal droplet formation, whereby interference with the ability of the panels of the dehumidification chamber to transmit solar radiation as a consequence of droplet formation is reduced.

10. The solar drying device of claim 7 wherein the inner and outer panels of the dehumidification chamber are made of flexible material, and wherein the dehumidification system includes means for vibrating at least the outer panel to clear it of condensed water.

11. The solar drying device of claim 10 including means for timing the vibrating means to select the frequency with which the condensed water is cleared, thereby allowing a selection of the ability of the panels to transmit solar radiation, thus providing means for controlling the temperature of the drying chamber.

12. The solar drying device of claim 10 including temperature responsive means for actuating the vibrating means whereby the condensed water is cleared and the panel's ability to transmit solar radiation is increased in response to a cooling of the drying chamber below a preselected temperature.

13. The solar drying device of claim 7 wherein the drying chamber has a base and a front wall that has an open and a closed position, the front wall having:
   (a) an upwardly facing portion including the dehumidification chamber, the panels of which are adapted to face toward the sun at a selected angle from the horizontal when the front wall is in its closed position, and (b) at least one hinge turning about a generally horizontal axis, attaching the front wall to the remainder of the drying chamber whereby the front wall may be swung upwardly on the hinge from its closed position to its open position wherein it is lifted high enough to allow substantially unrestricted access to the drying chamber.

14. The solar drying device of claim 13 wherein the front wall includes a downwardly facing portion extending from the lowest margin of the upwardly directed portion to the base when the front wall is in its closed position wherein the downwardly facing portion is generally parallel to the sun's rays at midday.

15. The solar drying device of claim 13 wherein the front wall is a substantially rigid, unitary structure and includes a cantilevered balance weight located rearwardly of the hinge, whereby the front wall is at least partially balanced on the hinge, and a user of the solar drying device may lift the front wall with reduced effort.

16. The solar drying device of claim 14 wherein the inner and outer panels are made of a flexible sheet material and wherein the dehumidification system includes means for directing air from the drying chamber into the dehumidification chamber at a pressure greater than that of the ambient atmosphere, inflating the dehumidification chamber and thus forcing the panels away from each other, and wherein at least one of the inner and outer panels has a water escape aperture extending therethrough at a location that is at the bottom of the dehumidification chamber when the front wall is in its closed position, whereby water condensed within the dehumidification chamber and drawn by gravity to the lower portions thereof may drain therefrom through the water escape aperture, being both drawn by gravity and expelled by the pressure of the air within the dehumidification chamber.

17. The solar drying device of claim 16 wherein at least one water escape aperture extends through the inner panel of the dehumidification chamber and wherein the downwardly facing portion of the front wall includes means for transmitting water draining from the water escape aperture through the downwardly facing portion and thus outside of the solar drying device to the ambient atmosphere.

18. A method for drying wet material in a solar heated drying chamber the front wall of which includes a dehumidification chamber having inner and outer panels made of solar radiation transmitting material and adapted to admit solar energy into the drying chamber to warm its contents above the temperature of the ambient atmosphere with which the outer panel is in contact, the method comprising the steps of (a) directing warm, moist air from the drying chamber between the inner and outer panels;

(b) condensing water from the warm, moist air on the outer panel;

(c) returning the air to one of the drying chamber and the ambient atmosphere; and (d) removing the condensed water from between the panels, expelling it from the dehumidification chamber, whereby the contents of the drying chamber may be thermally insulated from the ambient atmosphere in part by the dehumidification chamber.

19. The method for drying wet material specified in claim 18 wherein the step of removing the condensed water from between the panels includes applying a wetting agent at least to the inwardly facing side of the outer panel, thereby causing water condensing thereon to flow downwardly in a substantially smooth sheet with minimal droplet formation, whereby intereference with the ability of the panels of the dehumidification chamber to transmit solar radiation as a consequence of droplet formation is reduced.

20. The method for drying wet materials of claim 18 wherein the step of removing the condensed water from between the panels includes vibrating at least the outer panel to clear it of condensed water.

21. The method for drying wet material of claim 20 wherein the step of vibrating at least the outer panel includes initiating vibration as a consequence of the falling of the temperature of the air within the drying chamber below a selected temperature, whereby the solar radiation transmitting efficiency of the panels may be altered so as to encourage elevation of the temperature of the drying chamber.

22. The method for drying wet material of claim 18 wherein the air from the dehumidification chamber is directed to the drying chamber, whereby water may be removed from the air of the drying chamber.

* * * * *

UNITED STATES PATENT AND TRADEMARK OFFICE
CERTIFICATE OF CORRECTION

PATENT NO. : 4,490,926
DATED : January 1, 1985
INVENTOR(S) : Scott Stokes

It is certified that error appears in the above-identified patent and that said Letters Patent are hereby corrected as shown below:

At column 8, line 11, cancel "extend" and substitute therefor --exhaust--.

Signed and Sealed this

Fourteenth Day of May 1985

[SEAL]

*Attest:*

DONALD J. QUIGG

*Attesting Officer*  *Acting Commissioner of Patents and Trademarks*